US012604094B2

(12) United States Patent
Lee et al.

(10) Patent No.: US 12,604,094 B2
(45) Date of Patent: Apr. 14, 2026

(54) CAMERA MODULE

(71) Applicant: SAMSUNG ELECTRO-MECHANICS CO., LTD., Suwon-si (KR)

(72) Inventors: Donghoon Lee, Suwon-si (KR); Ju Ho Kim, Suwon-si (KR); Sanghyun Ji, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 135 days.

(21) Appl. No.: 18/112,186

(22) Filed: Feb. 21, 2023

(65) Prior Publication Data

US 2023/0336872 A1     Oct. 19, 2023

(30) Foreign Application Priority Data

Apr. 14, 2022    (KR) ........................ 10-2022-0046401
Aug. 10, 2022    (KR) ........................ 10-2022-0100118

(51) Int. Cl.
 *H04N 23/68* (2023.01)
 *H04N 23/54* (2023.01)
(52) U.S. Cl.
 CPC ........... *H04N 23/687* (2023.01); *H04N 23/54* (2023.01); *G03B 2205/0038* (2013.01)
(58) Field of Classification Search
 CPC .. H04N 23/682; H04N 23/685; H04N 23/687; G03B 2205/0038
 USPC ..................................................... 348/208.99
 See application file for complete search history.

(56) References Cited

U.S. PATENT DOCUMENTS

| | | | |
|---|---|---|---|
| 9,518,566 B2 | 12/2016 | Eddington et al. | |
| 2008/0198249 A1 | 8/2008 | Tanimura et al. | |
| 2013/0076923 A1 | 3/2013 | Kwon et al. | |
| 2015/0135703 A1* | 5/2015 | Eddington ......... | G02B 27/0025 |
| | | | 60/528 |
| 2018/0027182 A1* | 1/2018 | Takahashi .............. | G03B 17/00 |
| | | | 348/372 |
| 2018/0171991 A1 | 6/2018 | Miller et al. | |
| 2018/0321503 A1 | 11/2018 | Brown | |
| 2020/0120238 A1 | 4/2020 | Kim et al. | |
| 2021/0195073 A1* | 6/2021 | Saito ...................... | H04N 23/60 |
| 2022/0086317 A1 | 3/2022 | Paik et al. | |
| 2022/0190015 A1 | 6/2022 | Baik et al. | |

(Continued)

FOREIGN PATENT DOCUMENTS

| | | | |
|---|---|---|---|
| JP | 2008-203402 A | 9/2008 | |
| JP | 2013-072967 A | 4/2013 | |

(Continued)

OTHER PUBLICATIONS

Kazi, Arif, et al. "SMA actuator for optical image stabilization." *Actuator 2018; 16th International Conference on New Actuators.* VDE, Sep. 23, 2018. pp. 375-378.

(Continued)

*Primary Examiner* — Anthony J Daniels
(74) *Attorney, Agent, or Firm* — NSIP Law

(57) ABSTRACT

A camera module includes a lens barrel including a plurality of lenses, a case that accommodates the lens barrel, a sensor driver disposed in the case, and an image sensor mounted to the sensor driver, wherein, in an off state, a center of the image sensor is disposed in one direction with respect to an optical axis of the plurality of lenses.

17 Claims, 13 Drawing Sheets

(56)                    References Cited

U.S. PATENT DOCUMENTS

| | | | | |
|---|---|---|---|---|
| 2023/0007176 A1* | 1/2023 | Wang | .................. | H04M 1/0264 |
| 2023/0336856 A1* | 10/2023 | Park | ....................... | H04N 23/54 |
| 2024/0022816 A1* | 1/2024 | Yuan | .................... | G02B 27/646 |

FOREIGN PATENT DOCUMENTS

| | | | | |
|---|---|---|---|---|
| KR | 10-1592286 B1 | 2/2016 | | |
| KR | 10-2020-0042260 A | 4/2020 | | |
| KR | 10-2020-0086077 A | 7/2020 | | |
| KR | 10-2020-0106312 A | 9/2020 | | |
| WO | WO-2021104013 A1 * | 6/2021 | ............. | G03B 13/36 |

OTHER PUBLICATIONS

Korean Office Action issued on Feb. 21, 2024, in counterpart Korean Patent Application No. 10-2022-0100118 (6 pages in English, 6 pages in Korean).
Korean Office Action issued on Oct. 25, 2024, in counterpart Korean Patent Application No. 10-2022-0100118 (3 pages in English, 3 pages in Korean).
Korean Final Office Action Issued on Mar. 26, 2025, in Counterpart Korean Patent Application No. 10-2022-0100118 (3 Pages in English, 4 Pages in Korean).

* cited by examiner

DRb

DRa

CAMERA MODULE

CROSS-REFERENCE TO RELATED APPLICATIONS

This application claims the benefit under 35 USC 119(a) of Korean Patent Application Nos. 10-2022-0046401 filed on Apr. 14, 2022, and 10-2022-0100118 filed on Aug. 10, 2022, in the Korean Intellectual Property Office, the entire disclosures of which are incorporated herein by reference for all purposes.

BACKGROUND

1. Field

The present disclosure relates to a camera module.

2. Description of the Background

Development of information communication technology and semiconductor technology may increase the supply and use of electronic devices. Such electronic devices may be provided with a convergence of various functions rather than being provided within a traditional unique region.

Cameras may be adopted in portable electronic devices such as smartphones, tablet PCs, and laptop computers, and the cameras of these portable electronic devices may include an auto focus (AF) function and an image stabilizer (IS) function, and a zoom function may be added.

As the electronic device (portable electronic device) on which the camera module may be mounted becomes thinner, the size of the camera module may also be decreased, and accordingly, the effect of user hand shake on the camera module may increase.

Therefore, increasing image stabilization by reducing the influence of user's hand shake may be desirable.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens barrel including a plurality of lens, a case that accommodates the lens barrel, a sensor driver disposed in the case, and an image sensor mounted to the sensor driver, wherein, in an off state, a center of the image sensor is disposed in one direction with respect to an optical axis of the plurality of lenses.

The sensor driver may include a fixed portion connected to the case, a movable portion separated from the fixed portion and to which the image sensor is attached, and a plurality of driving wires connected between the fixed portion and the movable portion.

In an on state the plurality of driving wires are supplied with a current, and the movable portion may move in a horizontal movement direction on a plane perpendicular to the optical axis by deformation of a plurality of driving wires.

In the on state, the movable portion may move in a rotation movement direction with a rotation axis parallel to the optical axis by deformation of the plurality of driving wires.

In the off state, when the camera module is viewed from above, a distance between the fixed portion and the movable portion may be different depending on the position.

The plurality of driving wires may be connected adjacent to each edge of the movable portion.

The plurality of driving wires may be four that may be connected to four edges of the movable portion.

The plurality of driving wires may be connected while being adjacent to a corner of the movable portion.

The plurality of driving wires may be two that may be connected while being adjacent to two corners of the movable portion.

The plurality of driving wires may be connected while being adjacent to one corner portion of the fixed portion.

The camera module may further include one or more elastic members connected between the fixed portion and the movable portion.

The one or more elastic members may be connected to two of a plurality of edges of the movable portion.

The one or more elastic members may include a spring.

The one or more elastic members may include a plate spring or a leaf spring.

The one or more elastic members may have a curved shape along the edge of the moving portion.

The fixed portion may include a first current supply portion, and the moving portion may include a second current supply portion, and the plurality of driving wires may be electrically connected to the first current supply portion and the second current supply portion.

The sensor driver may include a fixed portion connected to the case, a movable portion separated from the fixed portion and to which the image sensor is attached, and a flexible deformation portion connected between the fixed portion and the movable portion.

In an on state, the image sensor may move in a horizontal movement direction on a plane perpendicular to the optical axis.

In the on state, the image sensor may rotate in a rotation movement direction with a rotation axis parallel with the optical axis.

In another general aspect, a camera module includes a lens barrel including a plurality of lenses, a case that accommodates the lens barrel, a fixed portion connected to the case, a movable portion separated from the fixed portion, a plurality of driving wires connected between the fixed portion and the movable portion, and an image sensor mounted to the movable portion, wherein, in an on state a current is supplied to the plurality of driving wires, the movable portion moves in a horizontal movement direction on a plane perpendicular to the optical axis and rotates in a rotation movement direction with a rotation axis parallel with the optical axis by deformation of the plurality of driving wires.

Other features and aspects will be apparent from the following detailed description, the drawings, and the claims.

BRIEF DESCRIPTION OF THE DRAWINGS

FIG. 7 and FIG. 8 are top plan views of an operation of a part of the sensor driver of FIG. 6.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
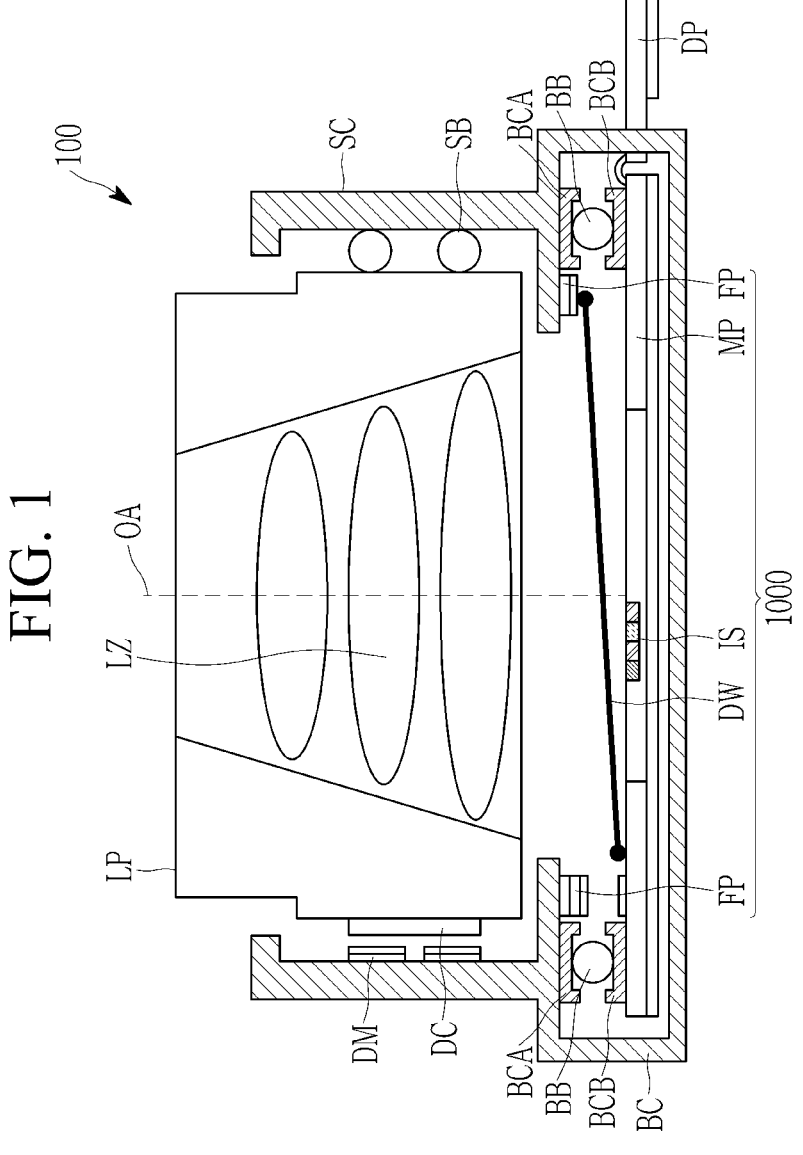
FIG. 1 is a schematic cross-sectional view of a camera module according to an embodiment.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Further, throughout the specification, the phrase "on a plane" means viewing a target portion from the top, and the phrase "on a cross-section" means viewing a cross-section formed by vertically cutting a target portion from the side.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

Embodiments as described herein provide a camera module that can increase image stabilization by providing accurate handshake correction.

However, the problems to be solved by the embodiments are not limited to the above-described problems and may be variously expanded in the range of the technical ideas included in the embodiments.

Referring to FIG. 1, a camera module according to an embodiment will be described. FIG. 1 is a schematic cross-sectional view of a camera module according to an embodiment.

Referring to FIG. 1, a camera module 100 according to an embodiment includes a lens barrel LP including one or more lenses LZ, a side case SC that accommodates the lens barrel LP, lens barrel drivers DM, DC, and SB that drive the lens barrel LP, a lower case BC connected to the side case SC, a sensor driver 1000 accommodated in the lower case BC, guide members BB, BCA, and BCB disposed between the sensor driver 1000 and the lower case BC, and a driving circuit portion DP connected to the sensor driver 1000.

The lens barrel drivers DM, DC, and SB move the lens barrel LP to focus the lens. The lens barrel drivers DM, DC, and SB may include a driving magnet DM and a driving coil DC disposed between the lens barrel LP and the side case SC, and the lens barrel drivers may move the lens barrel LP using an electromagnetic force between the driving magnet DM and the driving coil DC.

The lens barrel drivers DM, DC, and SB may include a plurality of movement auxiliary members SB disposed between the lens barrel LP and the side case SC, the plurality of movement auxiliary members SB may include a plurality of balls, and the plurality of movement auxiliary members SB maintain a gap between the lens barrel LP and the side case SC and assist the lens barrel LP moving along the side case SC.

The sensor driver 1000 may include a fixed portion FP connected and fixed to the lower case BC, and a movable portion MP connected to the fixed portion FP through a driving wire DW.

An image sensor IS may be mounted on the movable portion MP and moved together with the movable portion MP.

The movable portion MP on which the image sensor IS is mounted is connected to the driving circuit portion DP, and may receive a driving signal from the driving circuit portion DP.

The movable portion MP of the sensor driver 1000 may be capable of straight-line movement and rotation movement through the driving wire DW.

The guide members BB, BCA, and BCB may maintain a gap between the movable portion MP and the lower case BC, and guide a movement direction of the movable portion MP. The guide members BB, BCA, and BCB may include the upper guide groove BCA attached to the lower case BC, the lower guide groove BCB attached to the movable portion MP, and the ball member BB disposed between the upper guide groove BCA and the lower guide groove BCB. However, the embodiment is not limited thereto.

Referring to FIG. 1, when the camera module 100 is in the off state, the image sensor IS is not disposed in line with the optical axis in a direction parallel to the optical axis OA of the one or more lenses (e.g., a plurality of lenses) LZ, but is biased to one side along a plane that is perpendicular to the optical axis.

Figure 2:
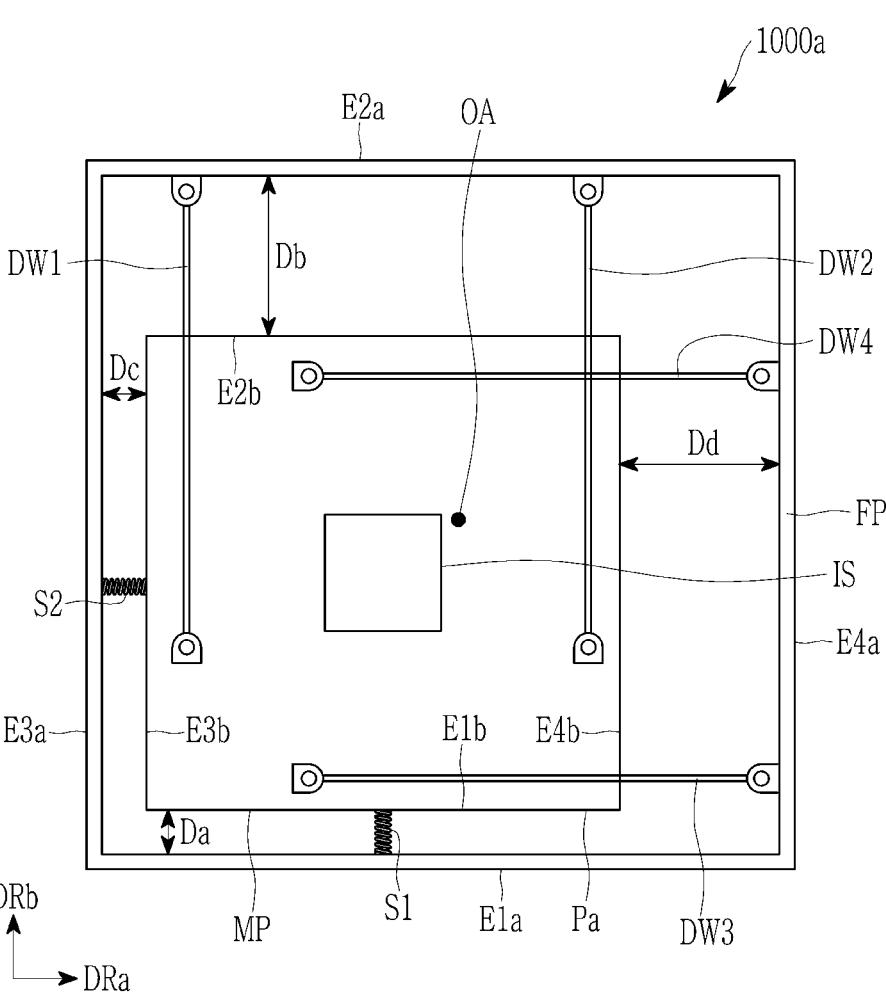
FIG. 2 is a top plan view of a sensor driver of a camera module according to an embodiment.
Figure 3:
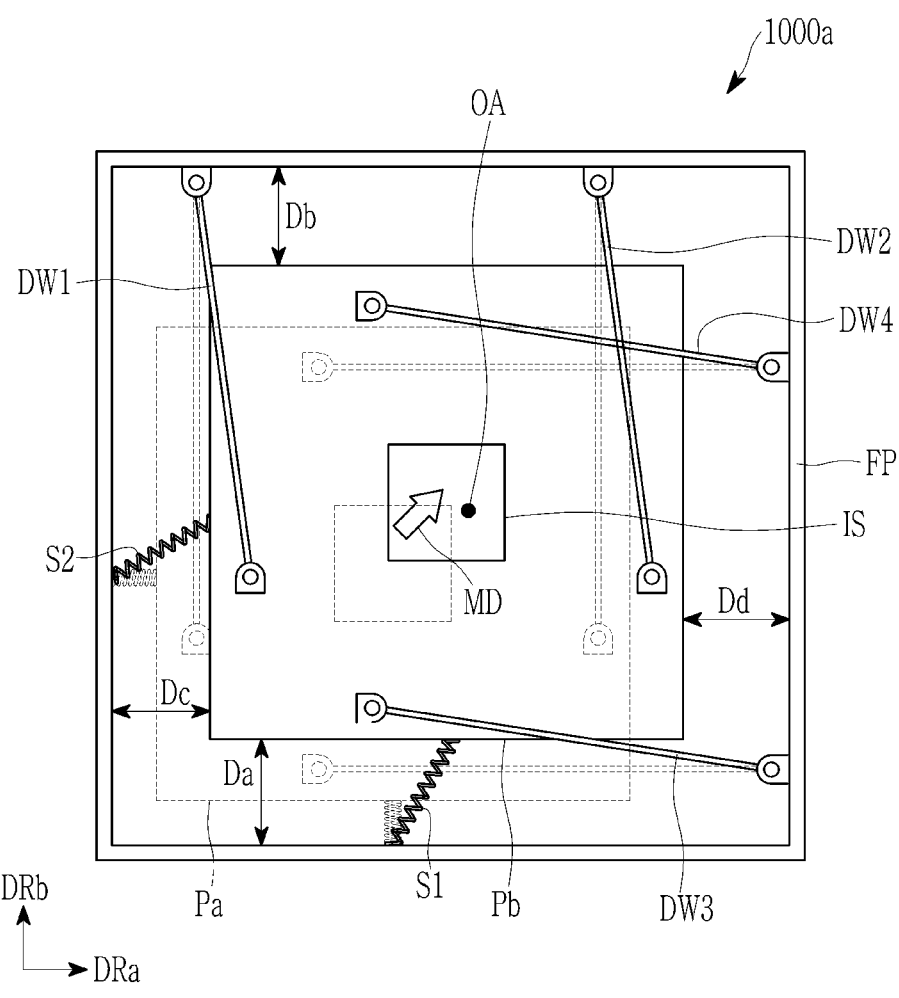
FIG. 3 and FIG. 4 are top plan views of operation of the sensor driver of FIG. 2.
Figure 4:
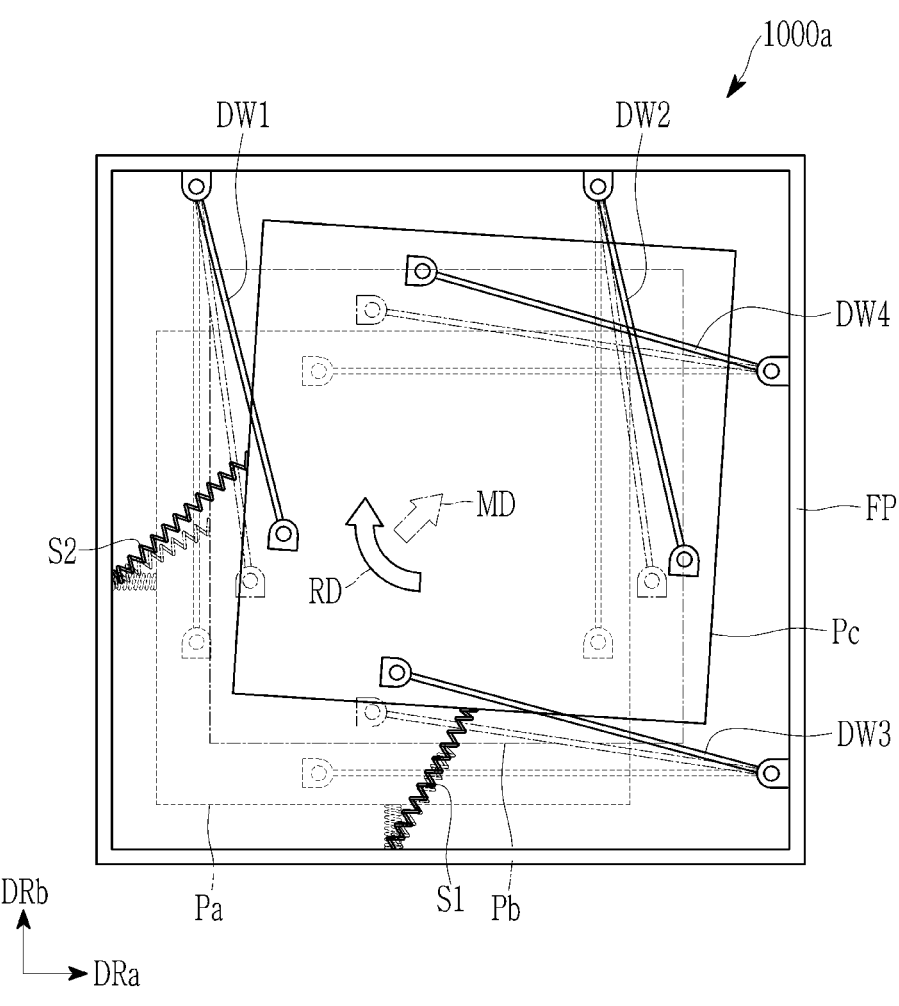

Referring to FIG. 1 and FIG. 2 to FIG. 4, a detailed structure and a driving operation of a sensor driver of a sensor driver of a camera module are shown according to an embodiment. FIG. 2 is a top plan view of a sensor driver of a camera module according to an embodiment, and FIG. 3 and FIG. 4 are top plan views of operation of the sensor driver of FIG. 2.

Referring to FIG. 1 and FIG. 2, a sensor driver 1000a according to an embodiment includes a fixed portion FP, a movable portion MP, a plurality of driving wires DW1, DW2, DW3, and DW4, and a plurality of elastic portions S1 and S2.

The fixed portion FP of the sensor driver 1000a may include a first edge E1*a* and a second edge E2*a* that are parallel to a first direction DRa and face each other, and a third edge E3*a* and a fourth edge E4*a* that are parallel to a second direction DRb and face each other.

Similarly, the movable portion MP of the sensor driver 1000a may include a fifth edge E1*b* that is adjacent to the first edge E1a of the fixed portion FP and parallel with the first direction DRa, a sixth edge E2*b* that is adjacent to the second edge E2*a* of the fixed portion FP and parallel with the first direction DRa, a seventh edge E3*b* that is adjacent to the third edge E3*a* of the fixed portion FP and parallel with the second direction DRb, and an eighth edge E4*b* that is adjacent to the fourth edge E4*a* of the fixed portion FP and parallel with the second direction DRb.

A plurality of driving wires DW1, DW2, DW3, and DW4 may include four driving wires disposed adjacent to each of the edges E1*b*, E2*b*, E3*b*, and E4*b* of the movable portion MP.

As described above, the image sensor IS may be mounted on the movable portion MP of the sensor driver 1000a.

An interval between the first edge E1*a* of the fixed portion FP of the sensor driver 1000a and the fifth edge E1*b* of the movable portion MP of the sensor driver 1000a may be a first distance Da, and an interval between the second edge E2*a* of the fixed portion FP of the sensor driver 1000a and the sixth edge E2*b* of the movable portion MP of the sensor driver 1000a may be a second distance Db, and the first distance Da and the second distance Db may be different from each other. The first distance Da may be narrower than the second distance Db.

In addition, an interval between the third edge E3*a* of the fixed portion FP of the sensor driver 1000a and the seventh edge E3*b* of the movable portion MP of the sensor driver 1000a may be a third distance Dc, an interval between the fourth edge E4*a* of the fixed portion FP of the sensor driver 1000a and the eighth edge E4*b* of the movable portion MP of the sensor driver 1000a may be a fourth distance Dd, and the third distance Dc and the fourth distance Dd may be different from each other. The third distance Dc may be narrower than the fourth distance Dd.

Accordingly, when a driving voltage is not applied to the sensor driver 1000a in an off state, the movable portion MP of the sensor driver 1000a may be disposed in a first position Pa disposed relatively to one side relative to the fixed portion FP of the sensor driver 1000a.

In addition, similarly to the movable portion MP, a central portion of the image sensor IS mounted on the movable portion MP may be disposed on one side instead of being disposed in line with the optical axis OA of the plurality of lenses LZ. For example, according to the embodiment shown in FIG. 2, the image sensor IS may be disposed to the left and downward from the optical axis OA. More specifically, the image sensor IS may be disposed closer to the first edge E1*a* than the second edge E2*a*, and closer to the third edge E3*a* than the fourth edge E4*a*.

The first elastic portion S1 may be disposed between the first edge E1*a* of the fixed portion FP of the sensor driver 1000a and the fifth edge E1*b* of the movable portion MP of the sensor driver 1000a that form a relatively narrower first distance Da than the second distance Db, and the second elastic portion S2 may be disposed between the third edge E3*a* of the fixed portion FP of the sensor driver 1000a and the seventh edge E3*b* of the movable portion MP of the sensor driver 1000a that form the third interval Dc that is relatively narrower than the fourth interval Dd.

The elastic portion may not be disposed between the second edge E2*a* of the fixed portion FP of the sensor driver 1000a and the sixth edge E2*b* of the movable portion MP of the sensor driver 1000a having a relatively wider second distance Db, and between the fourth edge E4a of the fixed portion FP of the sensor driver 1000a and the eighth edge E4b of the movable portion MP of the sensor driver 1000a having a relatively wider fourth interval Dd.

The plurality of driving wires DW1, DW2, DW3, and DW4 may include a first driving wire DW1 and a second driving wire DW2 that are connected to portions adjacent to the second edge E2a parallel with the first direction DRa of the fixed portion FP of the sensor driver 1000a and the seventh edge E3b and the eighth edge E4b parallel with the second direction DRb of the movable portion MP of the sensor driver 1000a and a third driving wire DW3 and a fourth driving wire DW4 that are connected to portions adjacent to the fourth edge E4a parallel with the second direction DRb of the fixed portion FP of the sensor driver 1000a and the fifth edge E1b and the sixth edge E2b parallel with the first direction DRa of the movable portion MP of the sensor driver 1000a.

Hereinafter, a driving operation of the sensor driver of the camera module according to the embodiment will be described with reference to FIG. 3 and FIG. 4, together with FIG. 1 and FIG. 2.

When the driving voltage is applied to the sensor driver in an on state, as shown in FIG. 3, a plurality of driving wires DW1, DW2, DW3, and DW4 are deformed such that the movable portion MP of the sensor driver 1000a may move along the movement direction MD. As such, the movable portion MP of the sensor driver 1000a moves along the movement direction MD, and thus the movable portion MP may move to the second position Pb.

That is, the movable portion MP of the sensor driver 1000a may be shifted in the horizontal direction on one plane that is perpendicular to the optical axis OA to move from the first position Pa to the second position Pb.

As the movable portion MP of the sensor driver 1000a is moved to the second position Pb, the first distance Da between the first edge E1a of the fixed portion FP of the sensor driver 1000a and the fifth edge E1b of the movable portion MP of the sensor driver 1000a may be almost the same as the second distance Db between the second edge E2a of the fixed portion FP and the sixth edge E2b of the movable portion MP of the sensor driver 1000a.

In addition, the third interval Dc between the third edge E3a of the fixed portion FP of the sensor driver 1000a and the seventh edge E3b of the movable portion MP of the sensor driver 1000a may be almost the same as the fourth distance Dd between the fourth edge E4a of the fixed portion FP of the sensor driver 1000a and the eighth edge E4b of the movable portion MP of the sensor driver 1000a.

As such, the movable portion MP of the sensor driver 1000a moves along the movement direction MD, and thus the movable portion MP may move to the second position Pb, whereby the image sensor IS attached to the movable portion MP of the sensor driver 1000a may be disposed in line with the optical axis OA of the plurality of lenses LZ. As such, after moving the image sensor IS to be disposed in line with the optical axis OA, the plurality of lenses LZ of the lens barrel LP are moved in a direction parallel to the optical axis OA to perform an autofocus (AF) operation.

Referring to FIG. 1 to FIG. 3 and FIG. 4, a plurality of driving wires DW1, DW2, DW3, and DW4 are deformed such that the movable portion MP of the sensor driver 1000a moves along the movement direction MD, and at the same time, the movable portion MP may move along a rotation direction RD with the direction parallel to the optical axis OA as the rotation axis. Accordingly, the movable portion MP of the sensor driver 1000a and the image sensor IS attached to the movable portion MP may move to the third position Pc. Through this, a more sophisticated optical image stabilizer OIS operation can be performed by correcting an error caused by shaking of the camera module 100 through rotation as well as horizontal movement.

As described, the sensor driver 1000a of the camera module 100 according to the present embodiment is shifted along the movement direction MD, which is the horizontal direction, on one plane that is perpendicular to the optical axis OA, and thus moves from the first position Pa to the second position Pb and rotates along the rotation direction RD such that it is possible to accurately perform the optical image stabilizer OIS operation that corrects an error caused by shaking.

In general, the OIS operation of the camera module can be performed through electron energy using magnets and coils, but in the sensor driver of the camera module according to the present embodiment, the movable portion MP of the sensor driver 1000a to which the image sensor IS is attached is moved in a plane perpendicular to the optical axis OA and simultaneously rotates around a rotation axis that is parallel with the optical axis OA using the plurality of driving wires DW1, DW2, DW3, and DW4, and thus it is possible to accurately perform an optical image stabilizer (OIS) operation while reducing electromagnetic interference between adjacent parts of the camera module, reducing driving power, and simplifying the parts of the camera module.

A plurality of elastic portions S1 and S2 of the sensor driver 1000a may have elasticity, and for example, may include a spring.

The plurality of elastic portions S1 and S2 of the sensor driver 1000a may be relaxed or contracted together according to the deformation of the plurality of driving wires DW1, DW2, DW3, and DW4, and they may help the plurality of driving wires DW1, DW2, DW3, and DW4 return to their original state when the power of the camera module is turned off.

Figure 5:
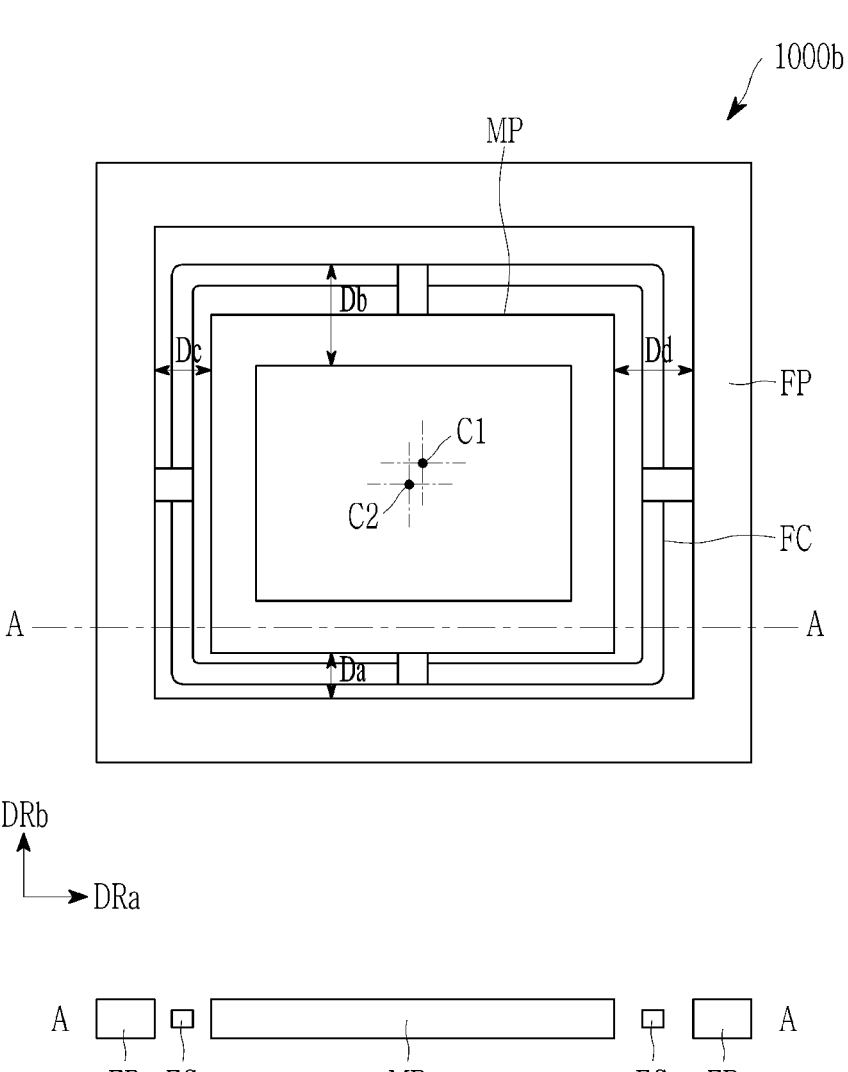
FIG. 5 is a schematic top plan and cross-sectional view of a sensor driver of a camera module according to another embodiment.

Next, referring to FIG. 5, a sensor driver 1000b according to another embodiment will be described. FIG. 5 is a schematic top plan and cross-sectional view of a sensor driver of a camera module according to another embodiment. In FIG. 5, the upper drawing is a top plan view of the sensor driver 1000b, and the lower drawing is a cross-sectional view of the sensor driver 1000b taken along line A-A.

Referring to FIG. 5, the sensor driver 1000b according to the present embodiment may include a deformation portion FC that is disposed to surround the periphery of a movable portion MP where an image sensor IS is mounted and disposed between the movable portion MP and a fixed portion FP. A portion of the deformation portion FC may be connected to the fixed portion FP, and a portion of the deformation portion FC may be connected to the movable portion MP. The deformation portion FC may be flexible and may be contracted or relaxed by an electric signal.

In FIG. 5, distances Da, Db, Dc, and Dd between the movable portion MP and the fixed portion FP may be different depending on the position, and a central position C1 of a driving circuit portion DP and a central position C2 of the image sensor IS attached to the movable portion MP may not overlap each other. The central position C2 of the image sensor IS may be disposed to be biased to one side from the central position C1 of the driving circuit portion DP. For example, according to the embodiment shown in FIG. 5, the central position C2 of the image sensor IS may be disposed to the left and downward from the central position C1 of the driving circuit portion DP.

When the camera module is turned on, the deformation portion FC receives a driving voltage from the driving circuit portion DP and contracts and relaxes such that the central position C2 of the image sensor IS may move toward the central position C1 of the driving circuit portion DP.

Many features of the sensor driver of the camera module described according to the embodiment with reference to FIG. 1 to FIG. 4 are applicable to the sensor driver of the camera module according to the present embodiment.

Figure 6:
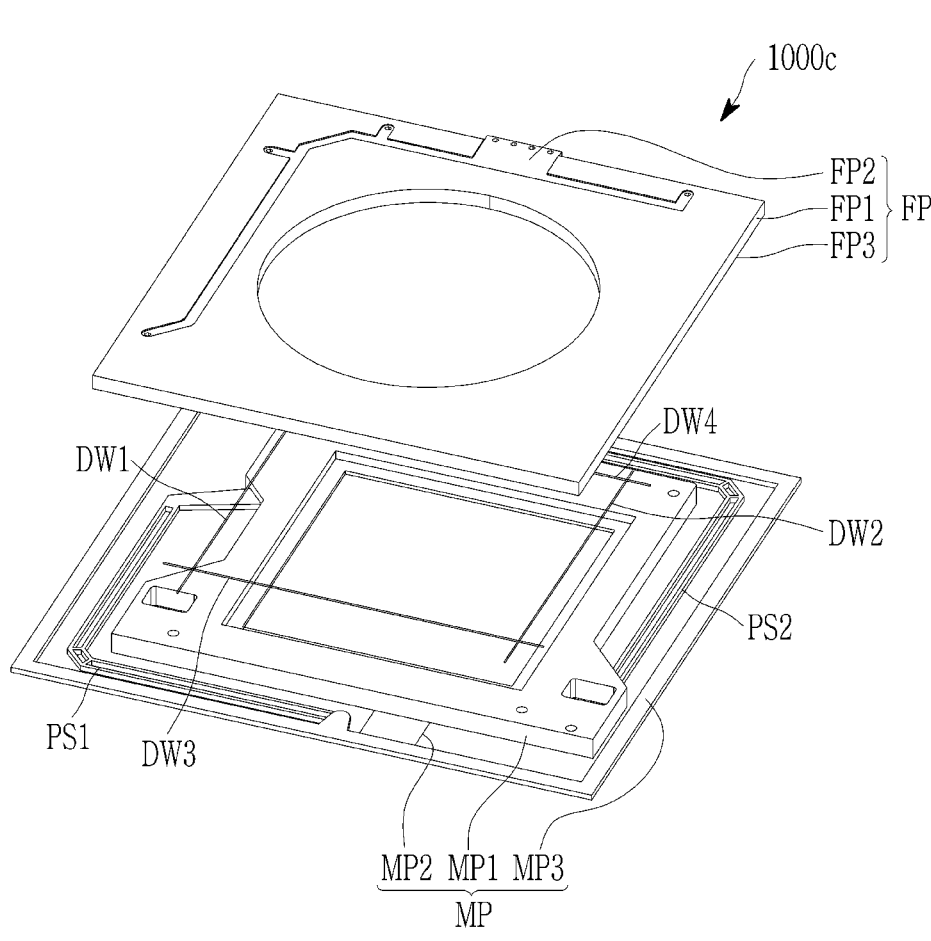
FIG. 6 is an exploded perspective view that schematically illustrates a sensor driver of a camera module according to another embodiment.
Figure 7:
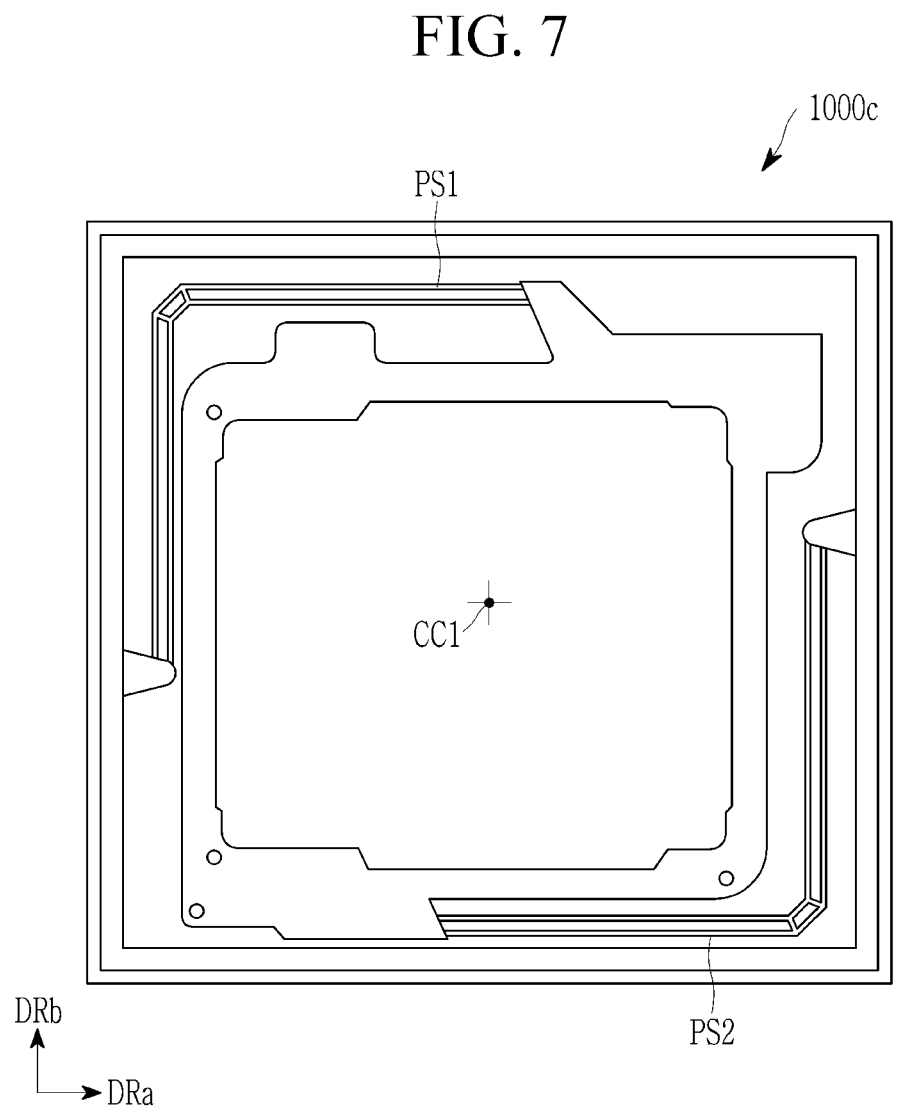
Figure 8:
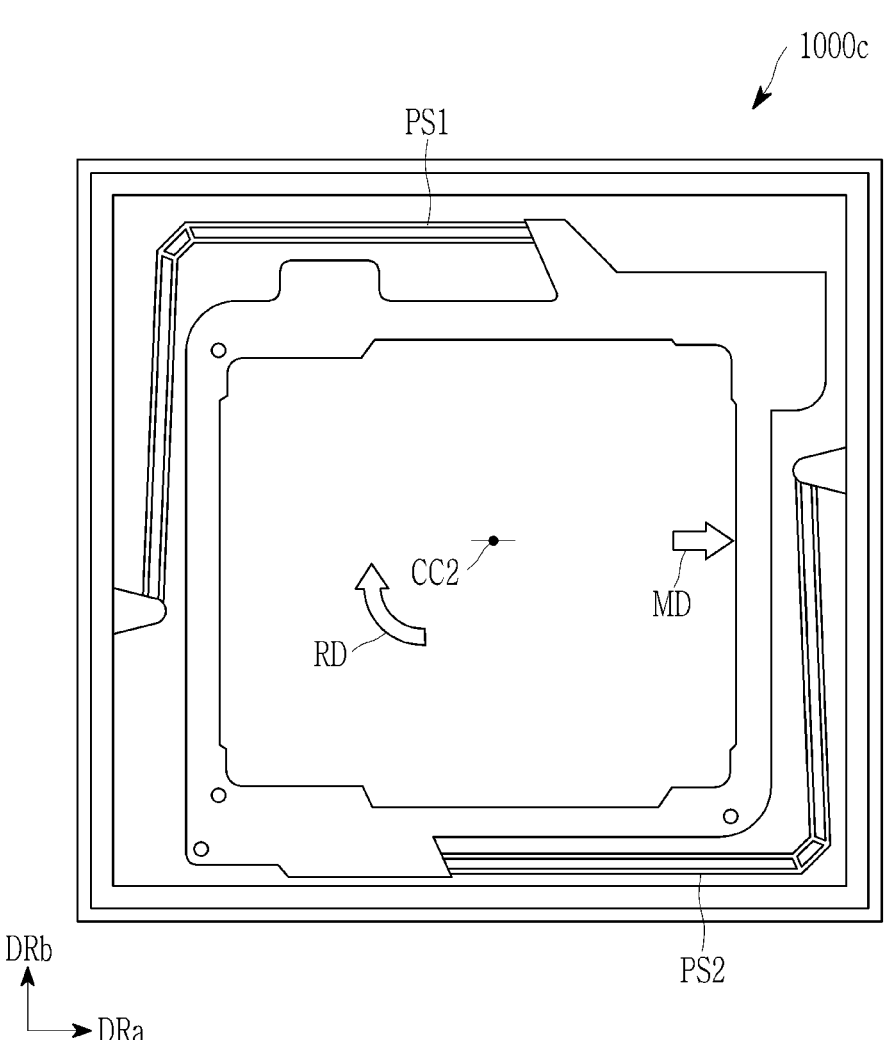

Referring to FIG. 6 to FIG. 8, a sensor driver of a camera module according to another embodiment will be described. FIG. 6 is an exploded perspective view that schematically illustrates a sensor driver of a camera module according to another embodiment, and FIG. 7 and FIG. 8 are top plan views of an operation of a part of the sensor driver of FIG. 6.

Referring to FIG. 6, a sensor driver 1000c of a camera module according to the present embodiment may include a fixed portion FP attached to a lower case BC, a movable portion MP that is disposed below the fixed portion FP, and a plurality of driving wires DW1, DW2, DW3, and DW4 disposed between the movable portion MP and the fixed portion FP. The plurality of driving wires DW1, DW2, DW3, and DW4 may be connected to the fixed portion FP and the movable portion MP.

The fixed portion FP may include a mold portion FP1, a current supply portion FP2 disposed over the mold portion FP1 and supplying a current, and a plate FP3 disposed below the mold portion FP1.

The movable portion MP may include a movable mold portion MP1, a current supply portion MP2 disposed below the mold portion MP1, a support portion MP3 disposed at an edge of the mold portion MP1, and at least one of elastic portions PS1 and PS2 connected between the mold portion MP1 and the support portion MP3.

The elastic portions PS1 and PS2 may have elasticity, and for example, the elastic portions PS1 and PS2 may be plate springs or leaf springs.

The plurality of driving wires DW1, DW2, DW3, and DW4 are electrically connected with the current supply portions FP2 and MP2 of the fixed portion FP and the movable portion MP and thus receive a driving current, may be deformed according to the driving current, and the mold portion MP1 of the movable portion MP is relatively movable with respect to the fixed portion FP according to the deformation of the plurality of driving wires DW1, DW2, DW3, and DW4.

Referring to FIG. 7, when the camera module is in an off state, similar to the camera module according to the embodiments described above, a center CC1 of the movable portion MP to which the image sensor IS of the camera module according to the present embodiment is attached may be disposed on one side on the plane that is perpendicular to an optical axis OA with respect to the optical axis OA.

Referring to FIG. 8, when the camera module is in the on state, similarly to the camera module according to the above-described embodiments, the movable portion MP to which the image sensor IS of the camera module according to the present embodiment is attached is moved in a movement direction MD such that a center CC2 of the movable portion MP may be changed toward the direction of the optical axis OA.

In this case, as the support portions PS1 and PS2 change shape, the movable portion MP may move on the plane that is perpendicular to the optical axis OA, and when the camera module is back to the off state, the shape of the supports PS1 and PS2 is changed back to the state shown in FIG. 7, thereby changing the position of the movable portion MP to the initial position.

As described above, the support portions PS1 and PS2 have elasticity and may have a plate spring or leaf spring shape, thereby helping the movable portion MP to move and return to its original position.

In addition, the support portions PS1 and PS2 have a shape that is bent once between the movable portion MP and the fixed portion FP, respectively, and may be symmetrical to each other with reference to the center of the movable portion MP. Accordingly, when the movable portion MP moves along a horizontal movement direction MD and a rotation direction RD, the movable portion MP may be stably moved through the support portions PS1 and PS2, and when the movable portion MP is restored to its original position, the movable portion MP may be stably restored through the support portions PS1 and PS2.

According to the illustrated embodiment, the sensor driver 1000c of the camera module according to the present embodiment includes two support portions PS1 and PS2 that are connected between the movable portion MP and the fixed portion FP, but this is not restrictive, and the movable portion is stably moved through one support portion and can be stably restored to its original position.

Many features of the sensor driver of the camera module described according to the embodiment with reference to FIG. 1 to FIG. 5 are all applicable to the sensor driver of the camera module according to the present embodiment.

Figure 9:
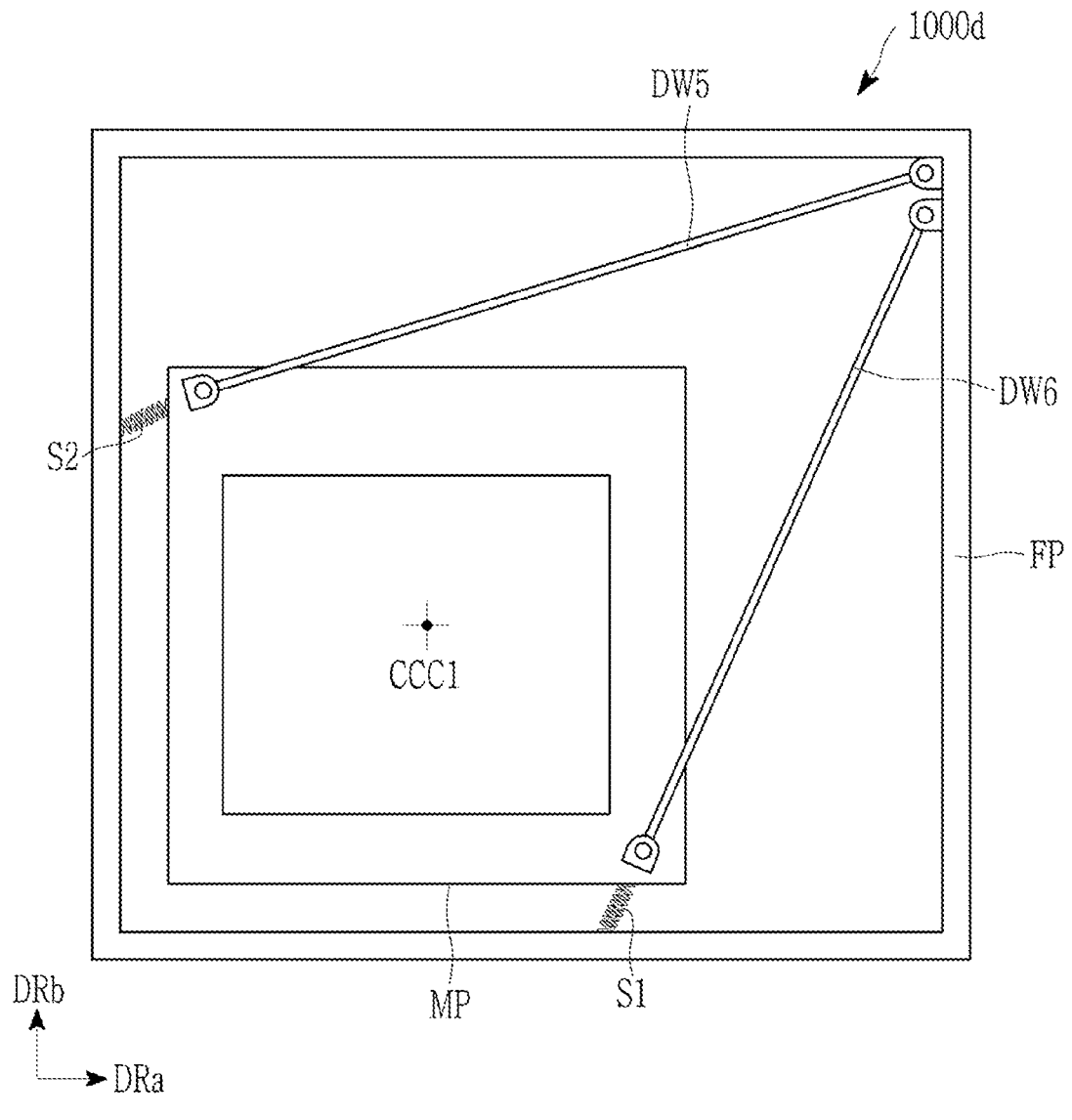
FIG. 9 is a top plan view that schematically illustrates a sensor driver of a camera module according to another embodiment.
Figure 10:
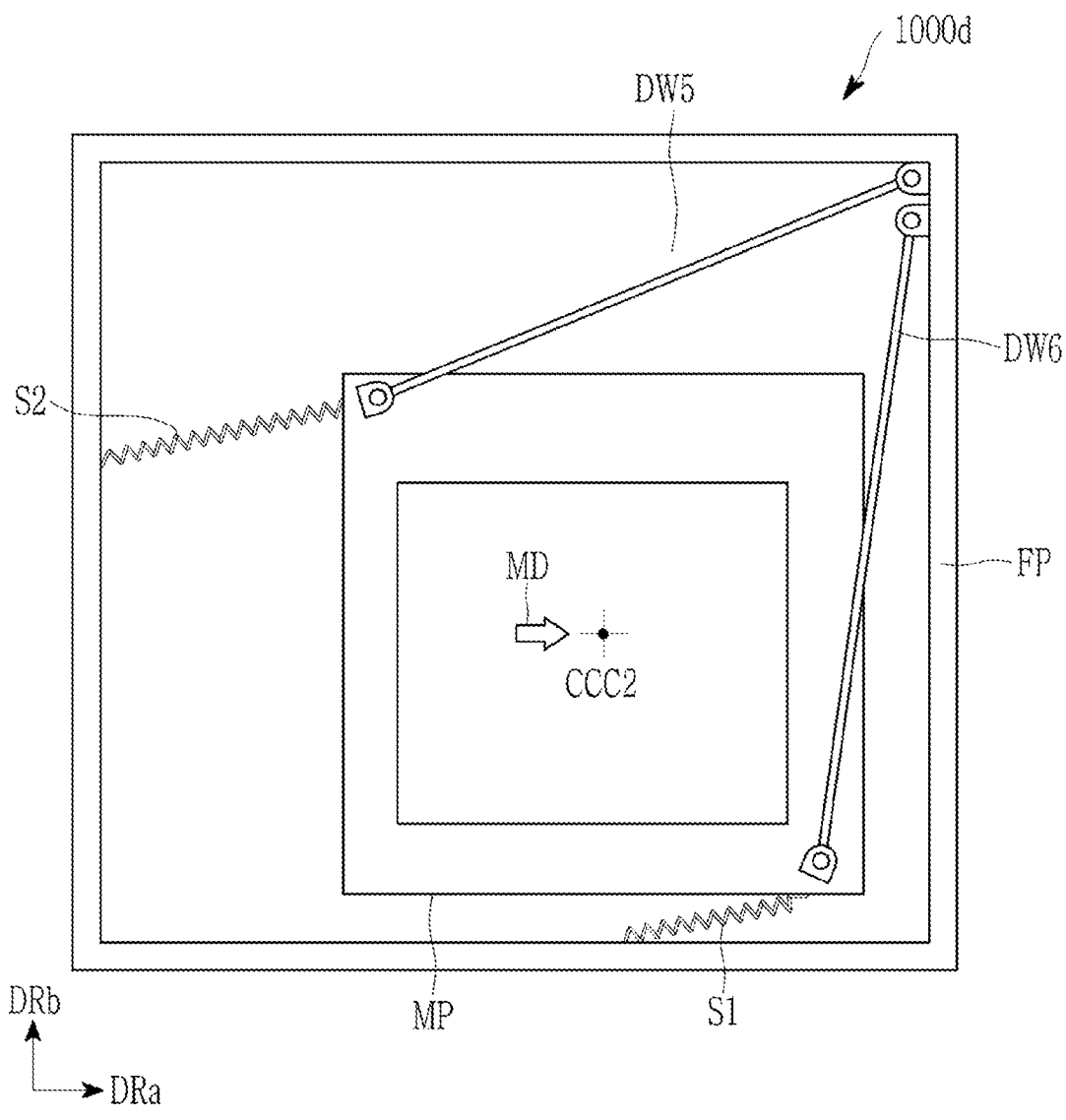
FIG. 10 and FIG. 11 are top plan views illustrating an operation of the sensor driver of FIG. 9.
Figure 11:
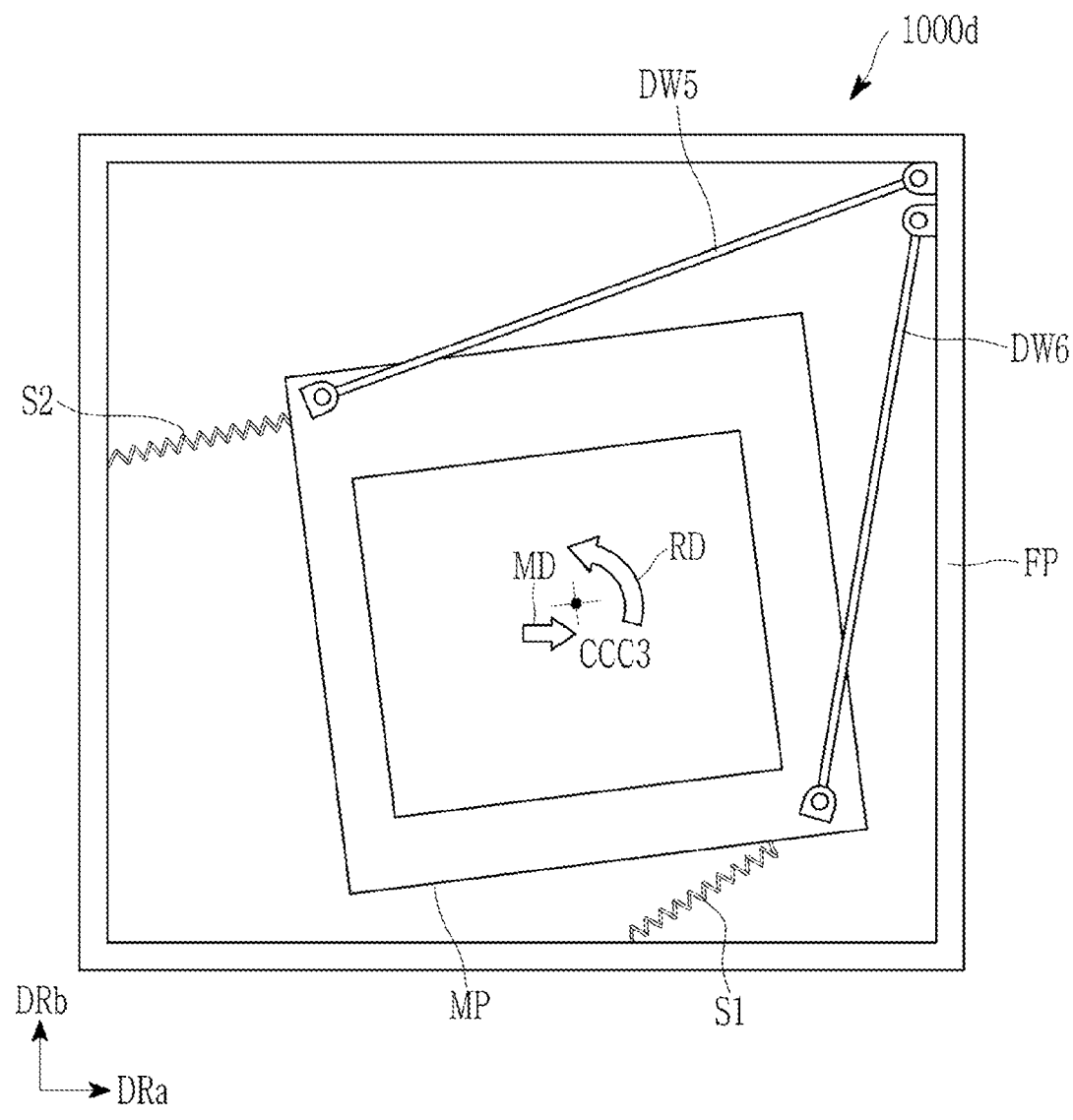

Referring to FIG. 9 to FIG. 11, a sensor driver 1000d of a camera module according to another embodiment will be described. FIG. 9 is a top plan view that schematically illustrates a sensor driver of a camera module according to another embodiment, and FIG. 10 and FIG. 11 are top plan views illustrating an operation of the sensor driver of FIG. 9.

Referring to FIG. 9, the sensor driver 1000d of the camera module according to the present embodiment is similar to the sensor driver 1000a of the camera module according to the embodiment described with reference to FIG. 1 to FIG. 4.

The sensor driver 1000d according to the present embodiment may include a fixed portion FP, a movable portion MP, driving wires DW5 and DW6, and a plurality of elastic portions S1 and S2.

However, unlike the sensor driver 1000a of the camera module according to the embodiment described with reference to FIG. 1 to FIG. 4, the sensor driver 1000d of the camera module according to the present embodiment may include two driving wires DW5 and DW6 connected to two corners of the movable portion MP and connected to one corner of the fixed portion FP.

Referring to FIG. 9 together with FIG. 1 and FIG. 2, when the camera module is in an off state, a central portion CCC1 of an image sensor IS attached to the movable portion MP of the sensor driver 1000d may be unilaterally disposed with respect to an optical axis OA. For example, according to the embodiment shown in FIG. 9, the image sensor IS may be unilaterally disposed from the optical axis OA in the left and downward directions.

Referring to FIG. 9 to FIG. 11 together with FIG. 1 and FIG. 2, when the camera module is in the on state, the movable portion MP moves along a horizontal movement direction MD and thus a center portion CCC2 of the image sensor IS moves along the horizontal direction, and simultaneously the center CCC2 of the image sensor IS moves along the rotation direction RD such that the center portion CCC3 of the image sensor IS may also rotate.

The two driving wires DW5 and DW6 are deformed such that the movable portion MP may move along the horizontal movement direction MD and simultaneously rotate along the rotation direction RD with a direction parallel to the optical axis OA as the rotation axis, and accordingly, the movable portion MP of the sensor driver 1000d and the image sensor IS attached to the movable portion MP may move along the horizontal movement direction MD and the rotation direction RD. Through this, a more sophisticated optical image stabilizer OIS operation may be performed by correcting an error caused by shaking of the camera module 100 through rotation as well as horizontal movement.

As such, the sensor driver 1000d of the camera module according to the present embodiment is horizontally moved along the horizontal movement direction MD, which is the horizontal direction, on one plane that is perpendicular to the optical axis OA, and rotates along the rotation direction RD such that an optical image stabilizer (OIS) operation that corrects the error caused by shaking can be accurately performed.

The elastic portions S1 and S2 of the sensor driver 1000d may be relaxed or contracted together according to the deformation of the driving wires DW5 and DW6, and when the power of the camera module is changed to an off state, the sensor driver 1000d helps the driving wires DW5 and DW6 move back to the original state.

Many features of the sensor driver of the camera module described according to the embodiment with reference to FIG. 1 to FIG. 8 are all applicable to the sensor driver of the camera module according to the present embodiment.

Next, a camera module 100a according to another embodiment will be described with reference to FIG. 12.

A camera module 100a according to the present embodiment is similar to the camera module 100 according to the embodiment described with reference to FIG. 1. A detailed description of the same constituent elements is omitted.

Figure 12:
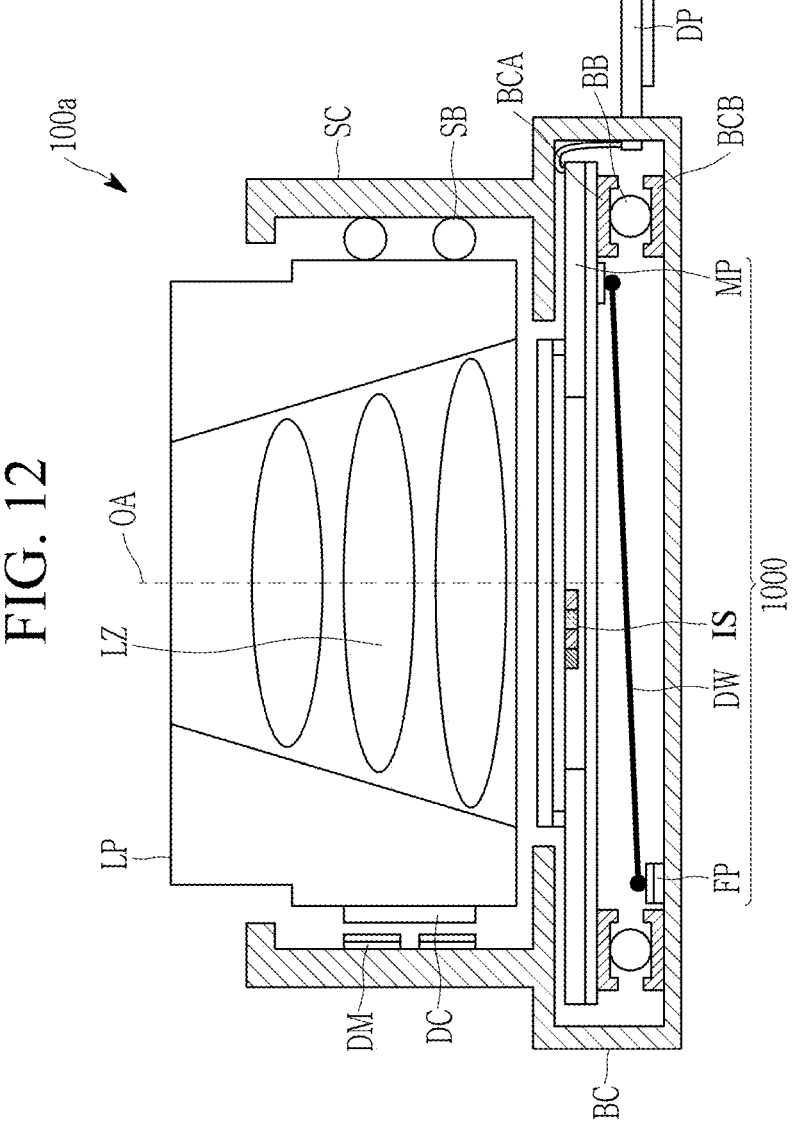
FIG. 12 is a schematic cross-sectional view of a camera module according to another embodiment.

Referring to FIG. 12, a camera module 100a according to the present embodiment may include a lens barrel LP including one or more lenses LZ, a side case SC that accommodates the lens barrel LP, lens barrel drivers DM, DC, and SB that drive the lens barrel LP, a lower case BC connected to the side case SC, a sensor driver 1000 accommodated in the lower case BC, guide members BB, BCA, and BCB disposed between the sensor driver 1000 and the lower case BC, and a driving circuit portion DP connected to the sensor driver 1000.

The sensor driver 1000 according to the present embodiment may include a fixed portion FP connected to and fixed to the lower case BC, and a movable portion MP connected to the fixed portion FP through a driving wire DW.

The movable portion MP of the sensor driver 1000 may be capable of straight-line movement and rotation movement through the driving wire DW, and the image sensor IS is mounted to the movable portion MP and thus moves together with the movable portion MP. The movable portion MP of the sensor driver 1000 may be capable of straight-line movement and rotation movement through the driving wire DW.

The guide members BB, BCA, and BCB may maintain a gap between the movable portion MP and the lower case BC, and guide a movement direction of the movable portion MP. The guide members BB, BCA, and BCB may include the upper guide groove BCA attached to the movable portion MP, the lower guide groove BCB attached to the lower case BC, and the ball member BB disposed between the upper guide groove BCA and the lower guide groove BCB. However, the embodiment is not limited thereto.

Unlike the camera module 100 according to the embodiment described with reference to FIG. 1, the driving wire DW of the camera module 100a and the guide members BB, BCA, and BCB according to the present embodiment may be disposed below the movable portion MP of the sensor driver 1000.

When the camera module 100a according to the embodiment is in the off state, the image sensor IS is not disposed in line with the optical axis in a direction parallel to the optical axis OA of the one or more lenses (e.g., a plurality of lenses) LZ, but is biased to one side along a plane that is perpendicular to the optical axis.

In addition, similar to the above-described embodiments, when the camera module is in the on state, the movable portion MP to which the image sensor IS is attached moves in the horizontal and rotation movement directions according to the operation of the driving wire DW such that errors caused by the shaking of the camera module 100a can be corrected not only through horizontal movement but also rotation movement, thereby performing a more accurate optical image stabilizer (OIS) operation.

Many features of the sensor driver of the camera module according to the embodiments described above are applicable to the camera module according to the present embodiment.

Figure 13:
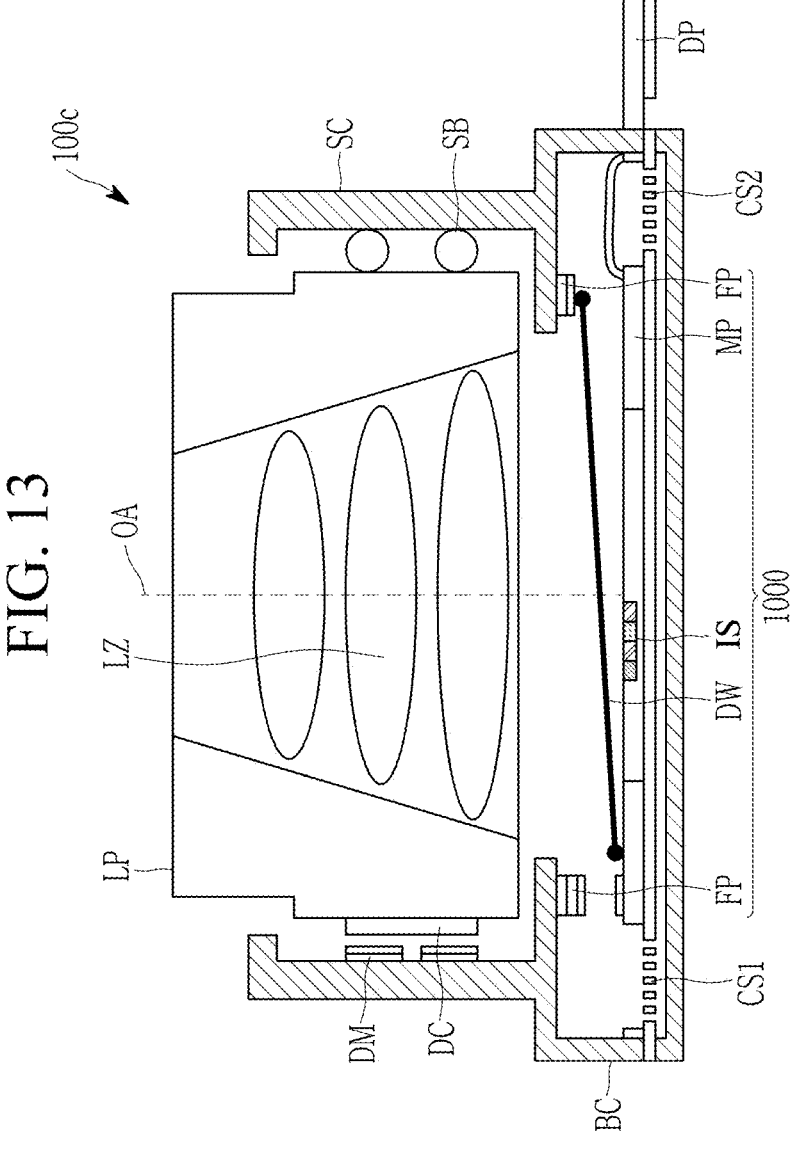
FIG. 13 is a schematic cross-sectional view of a camera module according to another embodiment.

Next, referring to FIG. 13, a camera module 100c according to another embodiment will be described. FIG. 13 is a cross-sectional view that schematically illustrates a camera module according to another embodiment.

Referring to FIG. 13, a camera module 100c according to an embodiment includes a lens barrel LP including one or more lenses (e.g., a plurality of lenses) LZ, a side case SC that accommodates the lens barrel LP, lens barrel drivers DM, DC, and SB that drive the lens barrel LP, a lower case BC connected to the side case SC, a sensor driver 1000 accommodated in the lower case BC, and a driving circuit portion DP that is connected to the sensor driver 1000.

The sensor driver 1000 of the camera module 100c according to the present embodiment may include a fixed portion FP connected to and fixed to the lower case BC and a movable portion MP connected to the fixed portion FP through a driving wire DW.

The movable portion MP of the sensor driver 1000 may be moved in a straight line and rotated through the driving wire DW, and the image sensor IS may be mounted on the movable portion MP and moved together with the movable portion MP. The movable portion MP of the sensor driver 1000 may be capable of straight line movement and rotation movement through the driving wire DW.

The guide members BB, BCA, and BCB may maintain a distance between the movable portion MP and the lower case BC, and guide the movement direction of the movable portion MP. The guide members BB, BCA, and BCB may include an upper guide groove BCA attached to the lower case BC, a lower guide groove BCB attached to the movable portion MP, and a ball member BB disposed between the upper guide groove BCA and the lower guide groove BCB. However, this is not restrictive.

However, unlike the camera module 100 according to the embodiment described with reference to FIG. 1, the camera module 100c according to the present embodiment may include elastic members CS1 and CS2 disposed between the sensor driver 1000 and the lower case BC instead of the guide members BB, BCA, and BCB disposed between the sensor driver 1000 and the lower case BC.

The elastic members CS1 and CS2 may support the sensor driver 1000 and maintain a distance between the lower case BC and the sensor driver 1000. In addition, the elastic members CS1 and CS2 have elasticity such that they help smooth movement of the movable portion MP without interfering with the movement of the movable portion MP of the sensor driver 1000.

When the camera module 100*c* according to the present embodiment is in the off state, the image sensor IS is not disposed in line with the optical axis along the direction parallel to the optical axis OA of the plurality of lens LZ, but is biased to one side along the plane that is perpendicular to the optical axis.

In addition, similar to the above-described embodiments, when the camera module is in the on state, the movable portion MP to which the image sensor IS is attached moves in the horizontal and rotation movement directions according to the operation of the driving wire DW such that errors caused by the shaking of the camera module 100*a* can be corrected not only through horizontal movement but also rotation movement, thereby performing a more accurate optical image stabilizer (OIS) operation.

Many features of the sensor driver of the camera module according to the embodiments described above are all applicable to the camera module according to the present embodiment.

According to the embodiments, it is possible to provide a camera module that can increase image stabilization by providing accurate hand shaking correction.

However, the effects of the embodiments are not limited to the above-described effects, and it is evident that the embodiments can be variously extended in a range that does not deviate from the spirit and region of this disclosure.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:

a lens barrel comprising a plurality of lenses;

a case that accommodates the lens barrel;

a sensor driver disposed in the case;

an image sensor mounted to the sensor driver;

a driving wire connected between a first side of the case and the sensor driver;

an elastic member connected between a second side of the case and the sensor driver; and a guide member between the sensor driver and the case, wherein, in an off state, a center of the image sensor is shifted with respect to an optical axis of the plurality of lenses, and wherein the guide member includes a ball member.

2. The camera module of claim 1, wherein the sensor driver comprises:

a fixed portion connected to the case;

a movable portion separated from the fixed portion and to which the image sensor is attached; and wherein the driving wire is connected between the fixed portion and the movable portion.

3. The camera module of claim 2, wherein in an on state the driving wire is supplied with a current, and the movable portion moves in a horizontal movement direction on a plane perpendicular to the optical axis by deformation of the driving wire.

4. The camera module of claim 3, wherein in the on state, the movable portion moves in a rotation movement direction with a rotation axis parallel to the optical axis by deformation of the driving wire.

5. The camera module of claim 2, wherein in the off state, when in a top view of the camera module, viewed along the optical axis from above, perpendicular to a plane of the image sensor, a distance between the fixed portion and the movable portion is different depending on a position.

6. The camera module of claim 5, wherein the driving wire is connected adjacent to an edge of the movable portion.

7. The camera module of claim 6, wherein the driving wire comprises plural driving wires, the driving wires are four that are connected to four edges of the movable portion, and the driving wires are connected to the first side of the case and a third side of the case.

8. The camera module of claim 5, wherein the driving wire is connected while being adjacent to a corner of the movable portion.

9. The camera module of claim 8, wherein the driving wire comprises plural driving wires, the driving wires are two that are connected while being adjacent to two corners of the movable portion, and the driving wires are connected to the first side of the case and a third side of the case.

10. The camera module of claim 9, wherein the driving wires are connected while being adjacent to one corner portion of the fixed portion.

11. The camera module of claim 5, wherein the elastic member is connected between the fixed portion and the movable portion.

12. The camera module of claim 2, wherein the elastic member comprises plural elastic members, and the elastic members are connected to the second side of the case and a fourth side of the case.

13. The camera module of claim 11, wherein the elastic member comprises a spring.

14. The camera module of claim 11, wherein the elastic member comprises a plate spring or a leaf spring.

15. The camera module of claim 14, wherein the elastic member comprises a curved shape along the edge of the moving portion.

16. The camera module of claim 5, wherein the fixed portion comprises a first current supply portion, and the moving portion comprises a second current supply portion, and the driving wire is electrically connected to the first current supply portion and the second current supply portion.

17. A camera module comprising:

a lens barrel comprising a plurality of lenses;

a case that accommodates the lens barrel;

a fixed portion connected to the case;

a movable portion separated from the fixed portion;

a driving wire connected between a first side of the case and the movable portion;

an elastic member connected between a second side of the case and the movable portion;

an image sensor mounted to the movable portion; and a guide member between the movable portion and the case, wherein, in an on state a current is supplied to the driving wire, the movable portion moves in a horizontal movement direction on a plane perpendicular to an optical axis and rotates in a rotation movement direction with a rotation axis parallel with the optical axis by deformation of the driving wire, and wherein the guide member includes a ball member.

* * * * *